United States Patent
Weng

(10) Patent No.: US 10,165,229 B2
(45) Date of Patent: Dec. 25, 2018

(54) NETWORK COMMUNICATION SYSTEM AND METHOD THEREOF

(71) Applicant: VIVOTEK INC., New Taipei (TW)

(72) Inventor: Shu-Che Weng, New Taipei (TW)

(73) Assignee: VIVOTEK INC., New Taipei (TW)

( * ) Notice: Subject to any disclaimer, the term of this patent is extended or adjusted under 35 U.S.C. 154(b) by 256 days.

(21) Appl. No.: 15/001,624

(22) Filed: Jan. 20, 2016

(65) Prior Publication Data

US 2016/0286172 A1    Sep. 29, 2016

(30) Foreign Application Priority Data

Mar. 25, 2015   (TW) .............................. 104109635 A

(51) Int. Cl.
  *H04L 29/06*    (2006.01)
  *H04N 7/18*    (2006.01)
  *H04N 21/61*    (2011.01)

(52) U.S. Cl.
  CPC ......... *H04N 7/183* (2013.01); *H04L 65/1069* (2013.01); *H04L 65/601* (2013.01); *H04N 21/6125* (2013.01)

(58) Field of Classification Search
  CPC .......................... H04L 65/1069; H04L 65/601
  USPC ........................................................ 709/227
  See application file for complete search history.

(56) References Cited

U.S. PATENT DOCUMENTS

2014/0267714 A1* 9/2014 Mistry ................. H04N 21/631
                                                                  348/143
2017/0155937 A1* 6/2017 Zhang ..................... H04L 69/08

FOREIGN PATENT DOCUMENTS

| TW | M426090 | 4/2012 |
| TW | M436211 | 8/2012 |
| TW | 201505435 | 2/2015 |

OTHER PUBLICATIONS

Office Action issued by TIPO dated Mar. 7, 2017 in related Application No. 10620249660, 6 pages.

\* cited by examiner

*Primary Examiner* — Adnan M Mirza
(74) *Attorney, Agent, or Firm* — Andrew M. Calderon; Roberts Mlotkowski Safran Cole & Calderon, P.C.

(57) ABSTRACT

A network communication system includes a surveillance device, one or more display devices, a cloud server, and an electronic device. The surveillance device is for capturing an environmental image of an environment. The cloud server stores connection information of the surveillance device and connection information of the display device bound to the surveillance device. When the electronic device sends a connection request requesting to be connected to and communicate with the surveillance device to the cloud server, the cloud server enables the electronic device to be simultaneously connected to and communicate with the surveillance device and the display device bound to the surveillance device according to the connection request and the connection information such that the electronic device receives the environmental image from the surveillance device and transmits one or more specific images to the display device.

11 Claims, 19 Drawing Sheets

TB

| Account | ID | | |
|---|---|---|---|
| Password | PW | | |
| Registered device 1(110) | UID1 | AD1 | ←—IF1 |
| Binding device 1(130-1) | UID21 | AD21 | ←—IF21 |
| Binding device 2(130-2) | UID22 | AD22 | ←—IF22 |
| Binding device 3(130-3) | UID23 | AD23 | ←—IF23 |

NETWORK COMMUNICATION SYSTEM AND METHOD THEREOF

CROSS-REFERENCES TO RELATED APPLICATIONS

This non-provisional application claims priority under 35 U.S.C. § 119(a) on Patent Application No. 104109635 filed in Taiwan, R.O.C. on Mar. 25, 2015, the entire contents of which are hereby incorporated by reference.

BACKGROUND

Technical Field

The instant disclosure relates to a surveillance technique and, more particularly, to a network communication system and method thereof adapted to integrate a surveillance device with a display device in the same environment.

Related Art

People's needs concerning surveillance systems have grown over the last few years. With the rapid development of communication techniques, the open policy of domestic communication markets, and, particularly, the rapid growth of Internet, surveillance stations tend to be remotely.

An image acquisition equipment, e.g., an internet protocol camera (IP camera), or an image convert equipment, e.g., a video server, can be utilized in a conventional surveillance system for remotely monitoring.

SUMMARY

In an embodiment, a network communication system comprises a surveillance device, at least one display device, a cloud server, and an electronic device. The cloud server is connected to and communicates with the surveillance device and the display device through a network. The electronic device is connected to the cloud server through the network. The surveillance device is for capturing an environmental image of an environment. The cloud server stores connection information of the surveillance device and connection information of the display device bound to the surveillance device. When the electronic device sends a connection request requesting to be connected to and communicate with the surveillance device to the cloud server, the cloud server enables the electronic device to be simultaneously connected to and communicate with the surveillance device and the display device bound to the surveillance device according to the connection request and the connection information such that the electronic device receives the environmental image from the surveillance device and transmits at least one specific image to at least one display device to display.

In an embodiment, a network communication method comprises receiving a connection request sent by an electronic device through a network by a cloud server, reading connection information of a surveillance device and at least one connection information of at least one display device bound to the surveillance device according to a first unique identifier of the surveillance device with which the connection request requests to be connected to and communicate by the cloud server, enabling the electronic device to be simultaneously connected to and communicate with the surveillance device and the display device by the read connection information, and transmitting an environmental image from the surveillance device to the electronic device and transmitting a specific image from the electronic device to the display device when the electronic device is simultaneously connected to and communicate with the surveillance device and the display device.

Concisely, available surveillance devices and display devices in the same environment (e.g., surveillance cameras for monitoring environmental safety installed on the ceiling outside an elevator of a building, such as a department store building, a commercial office building, a government building, or a shopping mall building and liquid crystal displays for displaying advertisements or floor guides installed on a wall outside an elevator; or home use web cameras for monitoring environmental safety and televisions or tablets for entertaining) are integrated based on the network communication system and method thereof of the instant disclosure, such that real-time dynamic instructions for applications of evacuation and telehealth can be easily and timely provided. Moreover, regarding implementation of embodiments of the instant disclosure, cost is relatively low, binding setting is relatively easy, hardware design is relatively simple, deployment of components is elastic, and bandwidth occupancy is relatively less based on the network communication system and method thereof of the instant disclosure.

DETAILED DESCRIPTION

Figure 1:
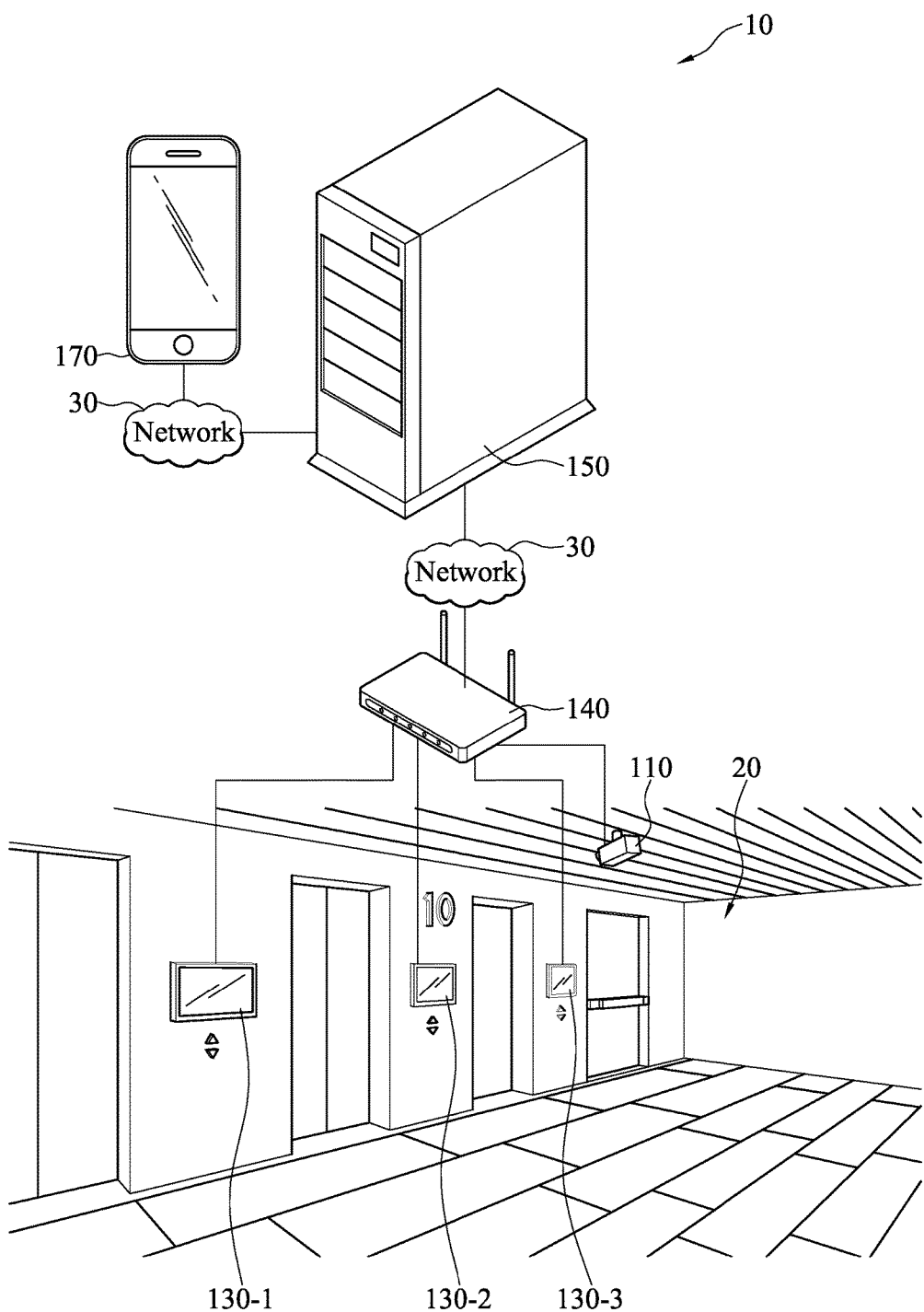
FIG. 1 illustrates a perspective view of a network communication system according to an embodiment of the instant disclosure.

FIG. 1 illustrates a perspective view of a network communication system according to an embodiment of the instant disclosure. Referring to FIG. 1, the network communication system 10 comprises a surveillance device 110, at least one display device 130-1, 130-2, 130-3, a cloud server 150, and an electronic device 170. Herein, the surveillance device 110 and the display devices 130-1, 130-2, and 130-3 are in the same environment 20. The cloud server 150 is connected to and communicates with the surveillance device 110, the display devices 130-1, 130-2, and 130-3, and the electronic device 170 through a network 30. Wherein, the electronic device 170 can be any electronic device with a user interface and a network communication capability, such as a personal computer, a smart phone, a laptop computer, a tablet computer, or a smart appliance. The electronic device 170 can also be a mainframe of a central control center for safety monitoring of the environment 20. In some embodiments, the surveillance device 110 and the display devices 130-1, 130-2, and 130-3 can be connected to and communicate with the cloud server 150 through a hub 140. The surveillance device 110, the display devices 130-1, 130-2, and 130-3, and the hub 140 can be connected to each other through wires, such as Ethernet, or in a wireless manner, such as Wi-Fi.

Figures 2, 3:
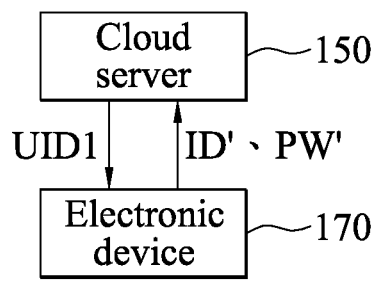
FIG. 2 illustrates a device table according to an embodiment of the instant disclosure.
FIGS. 3 to 5 illustrate block diagrams of operation of the network communication system of FIG. 1 according to a first implementation.

The cloud server 150 stores connection information (hereinafter called "the first connection information IF1") of the surveillance device 110 and connection information (hereinafter called "the second connection information IF21, IF22, and IF23") of the display devices 130-1, 130-2, and 130-3 bound to the surveillance device 110. As shown in FIG. 2. Referring to FIG. 2, the first connection information IF1 comprises a unique identifier (hereinafter called "the first unique identifier UID1") and address data (hereinafter called "the first address data AD1") which can be, for example, a uniform/universal resource locator (URL), an IP address, a port number, or a jumping rules of ports of a firewall of the surveillance device 110. Moreover, the second connection information IF21/IF22/IF23 comprises unique identifiers of each of the display devices 130-1/130-2/130-3 (hereinafter called "the second unique identifiers UID21/UID22/UID23") and address data (hereinafter called "the second address data AD21/AD22/AD23") which can be, for example, a uniform/universal resource locator (URL), an IP address, a port number, or a jumping rules of ports of a firewall of the display devices 130-1/130-2/130-3. The cloud server 150 may be provided with a device table TB to record accounts ID and passwords PW of users and to record registered device and bound devices belonging to each of the accounts ID. Although that the example of the device table TB of FIG. 2 comprises one account, one surveillance device is registered to the account, and three display devices are bound to the surveillance device, the number of the components of the instant disclosure is not limited to the example. For instance, each device table TB can record two or more accounts, each of the accounts can be registered with two or more surveillance devices, each of the surveillance devices can be bound with three display devices, or any combination thereof. In some embodiments, each of the surveillance devices can be configured to be capable of being bound with only one display device, or can be configured to be capable of being bound with multiple display devices. In some embodiments, each of the accounts can be configured to be capable of being registered with only one surveillance device, or can be configured to be capable of being registered with multiple surveillance devices.

When the electronic device 170 sends a connection request requesting to be connected to and communicate with the surveillance device 110 to the cloud server 150, the cloud server 150 enables the electronic device 170 to be simultaneously connected to and communicate with the surveillance device 110 and the display devices 130-1, 130-2, and 130-3 bound to the surveillance device 110 according to the connection request and the first address data and the second address data such that the electronic device 170 receives an environmental image IMe from the surveillance device 110 and transmits at least one specific image IMs to at least one of the display devices 130-1, 130-2, and 130-3 to display.

Figure 4:
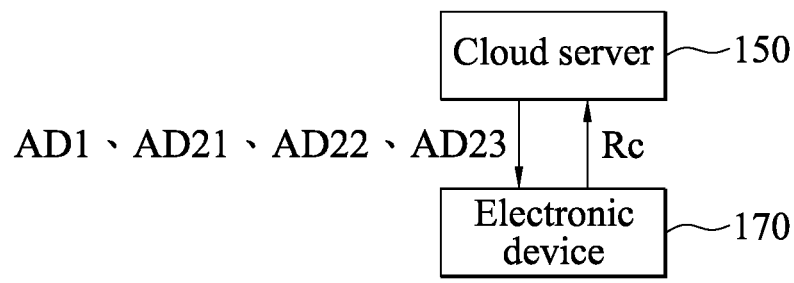
Figure 5:
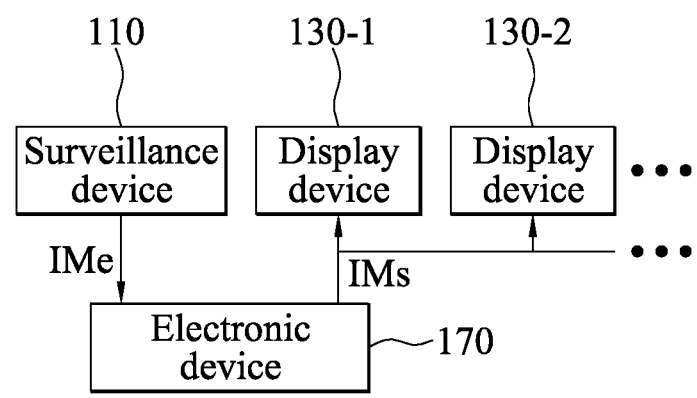
Figure 9:
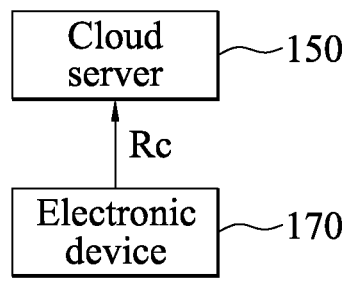
FIGS. 9 to 10 illustrate block diagrams of partial operation of the network communication system of FIG. 1 according to a second implementation.
Figure 10:
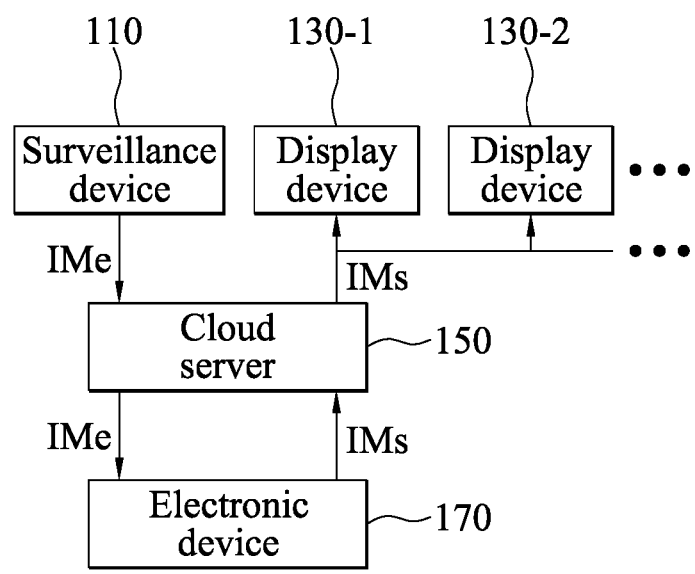

FIGS. 3 to 5 illustrate block diagrams of operation of the network communication system of FIG. 1 according to an implementation. FIGS. 9 to 10 illustrate block diagrams of partial operation of the network communication system of FIG. 1 according to another implementation.

Figure 6:
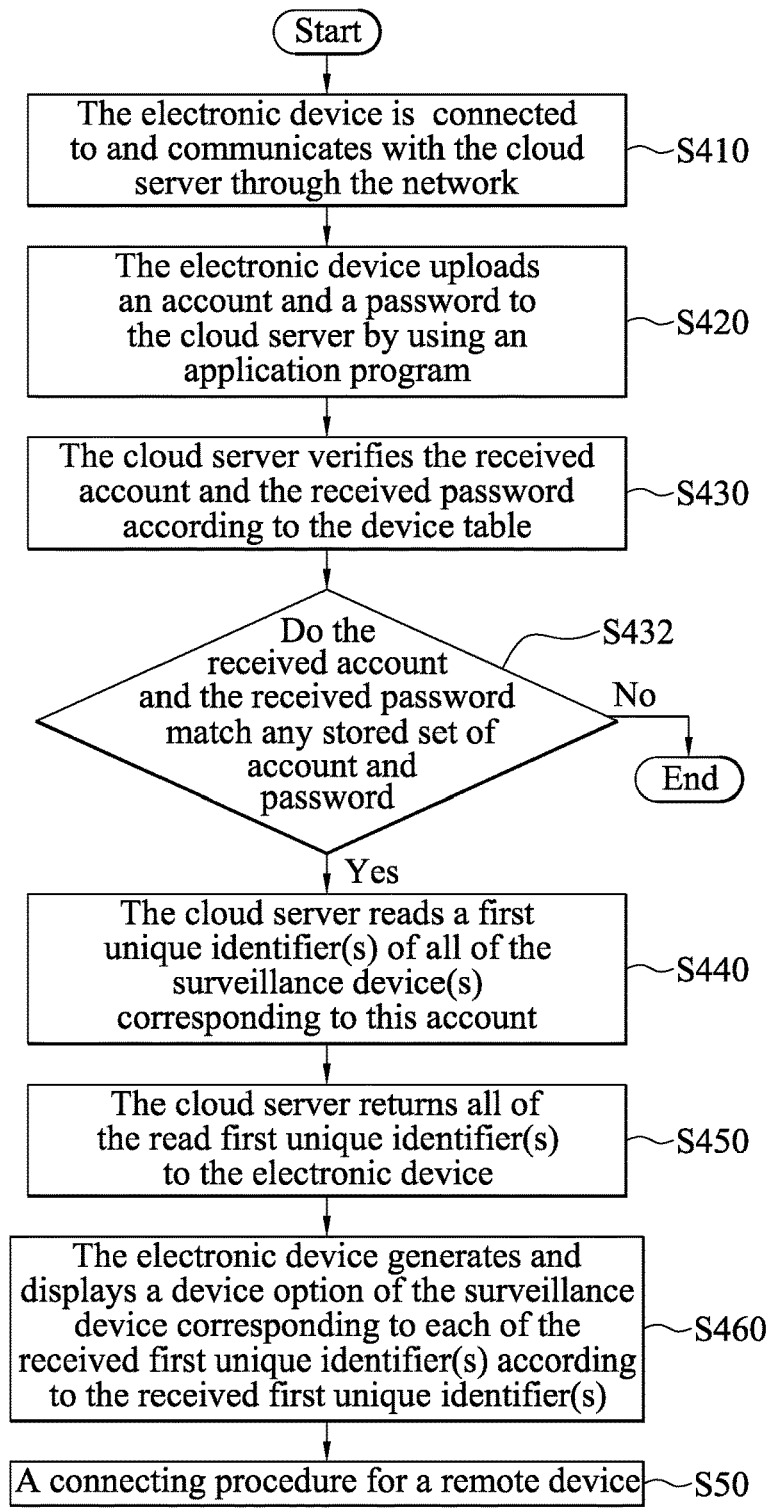
FIG. 6 illustrates a flow chart of a system login method according to an embodiment of the instant disclosure.

Referring to FIG. 6, FIG. 6 illustrates a flow chart of a system login method according to an embodiment of the instant disclosure. In some embodiments, the electronic device 170 is connected to and communicates with the cloud server 150 through the network 30 (step S410) and upload identifications ID' and passwords PW' to the cloud server 150 by using an application program, e.g., a computer application program or a mobile application program (step S420), as shown in FIG. 3.

The cloud server 150 verifies the received account ID' and the received password PW' according to the device table TB of FIG. 2 to confirm the identity of the electronic device 170 (step S430). The cloud server 150 confirms whether the received account ID' and the received password PW' match any set of account ID and password PW corresponding to each other recorded in the device table TB (step S432). When the identity of the electronic device 170 is confirmed, i.e., the cloud server 150 finds a matched set of account ID and password PW recorded in the device table TB, the cloud server 150 reads a first unique identifier(s) UID1 of all of the surveillance device(s) 110 corresponding to this account ID (step S440), i.e., the unique identifier(s) of all of the registered device(s) belonging to this account ID in the device table TB, and returns all of the read first unique identifier(s) UID1 to the electronic device 170 (step S450). The electronic device 170 receives the first unique identifier UID1 from the cloud server 150 and generates and displays a device option of the surveillance device 110 corresponding to each of the received first unique identifier(s) UID1 according to the received first unique identifier(s) UID1 (step S460), so that a user can select a remote device to which he wants to connect to perform a connecting procedure for a remote device (step S50).

Figure 7:
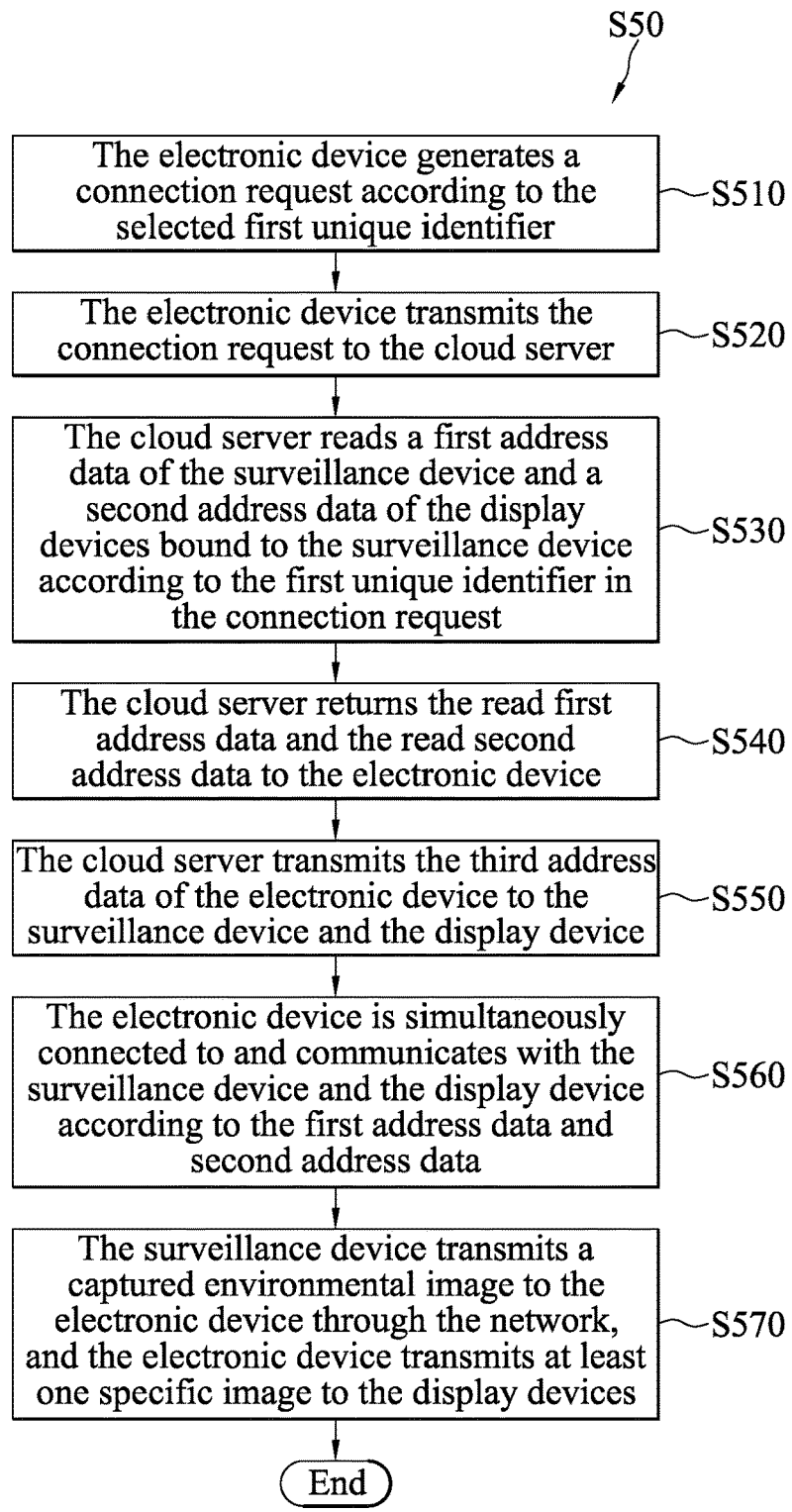
FIG. 7 illustrates a flow chart of a network communication method according to an embodiment of the instant disclosure.

Referring to FIG. 7, FIG. 7 illustrates a flow chart of a network communication method according to an embodiment of the instant disclosure. After the user selects a remote device to which he wants to connect, the electronic device 170 generates a connection request Rc according to the first unique identifier UID1 corresponding to a selected device option (step S510) and transmits the generated connection request Rc to the cloud server 150 through the network 30 (step S520), as shown in FIGS. 4 and 9. In other words, the connection request Rc carries with the selected first unique identifier UID1, i.e., the first unique identifier UID1 of the surveillance device 110 which the electronic device 170 requests to be connected to and communicate with.

After the cloud server 150 receives the connection request Rc, the cloud server 150, according to the first unique identifier UID1 in the connection request Rc, reads a first address data AD1 of the surveillance device 110 represented by the first unique identifier UID1 through the device table TB and a second address data AD21, AD22, and AD23 of the display devices 130-1, 130-2, and 130-3 bound to the surveillance device 110 (step S530).

In some embodiments, the cloud server 150 returns the read first address data AD1 and the read second address data AD21, AD22, and AD23 to the electronic device 170 (step S540), as shown in FIG. 4.

Herein, the connection request Rc also carries with an address data of the electronic device 170 (hereinafter called "a third address data"). The third address data is, for example, a uniform/universal resource locator (URL), an IP address, a port number, or a jumping rules of ports of a firewall of the electronic device 170, etc. The cloud server 150 also transmits the third address data to the surveillance device 110 and the display devices 130-1, 130-2, and 130-3 according to the first address data AD1 and the second address data AD21, AD22, and AD23 (step 550).

The electronic device 170 requests the surveillance device 110 and the display devices 130-1, 130-2, and 130-3 for connection by point-to-point technology based on the first address data AD1 and the second address data AD21, AD22, and AD23. The surveillance device 110 and the display devices 130-1, 130-2, and 130-3 request the electronic device 170 for connection by point-to-point technology based on the third address data. As a result, the electronic device 170 can be simultaneously connected to and communicate with the surveillance device 110 and the display devices 130-1, 130-2, and 130-3 (step S560).

When the electronic device 170 is simultaneously connected to and communicate with the surveillance device 110 and the display devices 130-1, 130-2, and 130-3, the surveillance device 110 captures an environmental image IMe, i.e., an image generated by the surveillance device 110 shooting the environment 20, and transmits the captured environmental image IMe to the electronic device 170 through the network 30, and the electronic device 170 transmits at least one specific image IMs to the display devices 130-1, 130-2, and 130-3 (step S570), as shown in FIG. 5.

Figure 8:
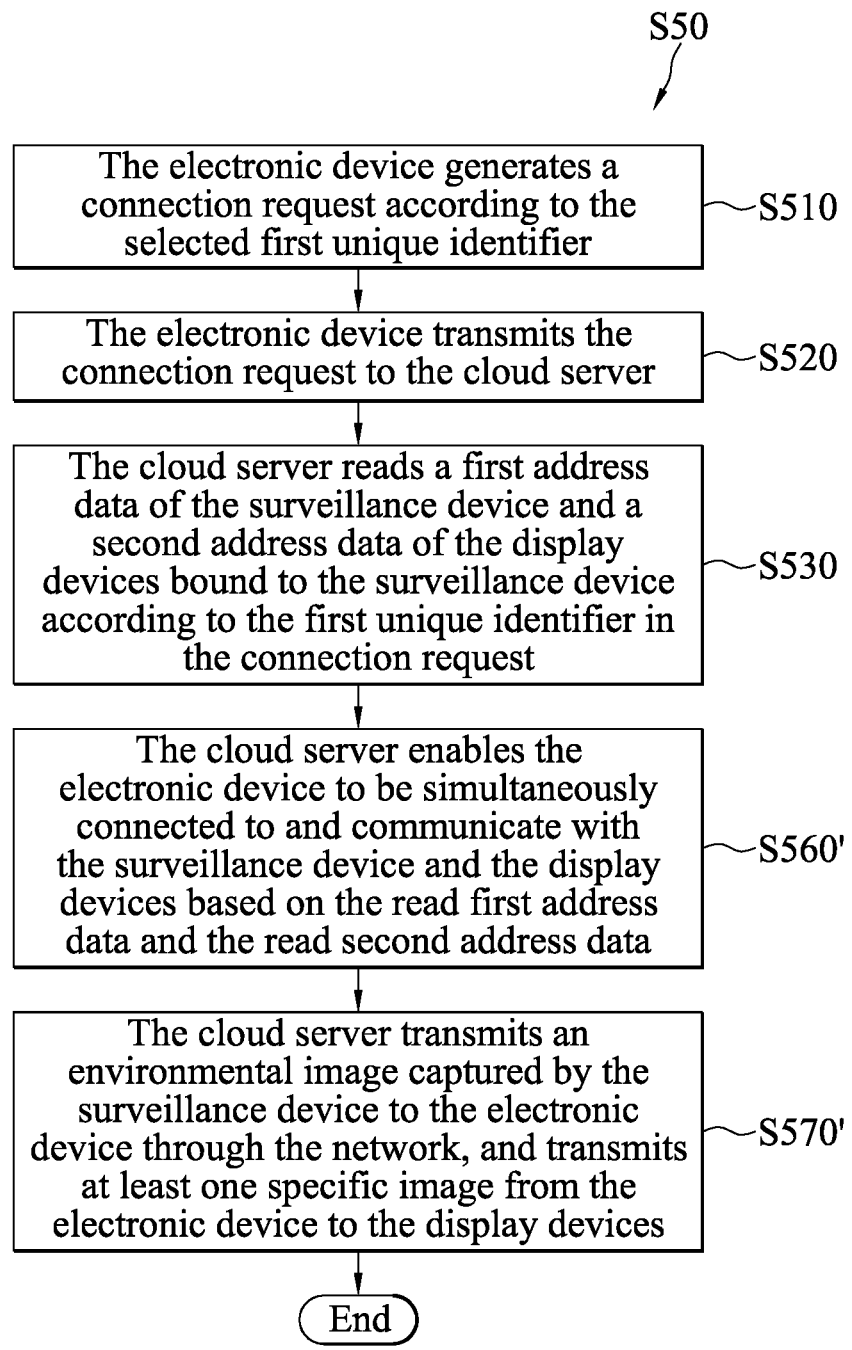
FIG. 8 illustrates a flow chart of a network communication method according to another embodiment of the instant disclosure.

Referring to FIG. 8, FIG. 8 illustrates a flow chart of a network communication method according to another embodiment of the instant disclosure. In other embodiments, the cloud server 150 enables the electronic device 170 to be simultaneously connected to and communicate with the surveillance device 110 and the display devices 130-1, 130-2, and 130-3 based on the read first address data AD1 and the read second address data AD21, AD22, and AD23 (step S560').

When the electronic device 170 is simultaneously connected to and communicates with the surveillance device 110 and the display devices 130-1, 130-2, and 130-3, the cloud server 150 transmits an environmental image IMe captured by the surveillance device 110 to the electronic device 170, and transmits a specific image IMs from the electronic device 170 to the display devices 130-1, 130-2, and 130-3 (step S570'), as shown in FIG. 10.

Herein, the electronic device 170 displays the received environmental image IMe. The display devices 130-1, 130-2, and 130-3 respectively display usual pictures, such as TV programs, game pictures, advertisements, activity summaries, or floor guides, before receiving the specific image IMs. The display devices 130-1, 130-2, and 130-3 are switched to display the specific image IMs when receiving the specific image IMs.

Figure 11:
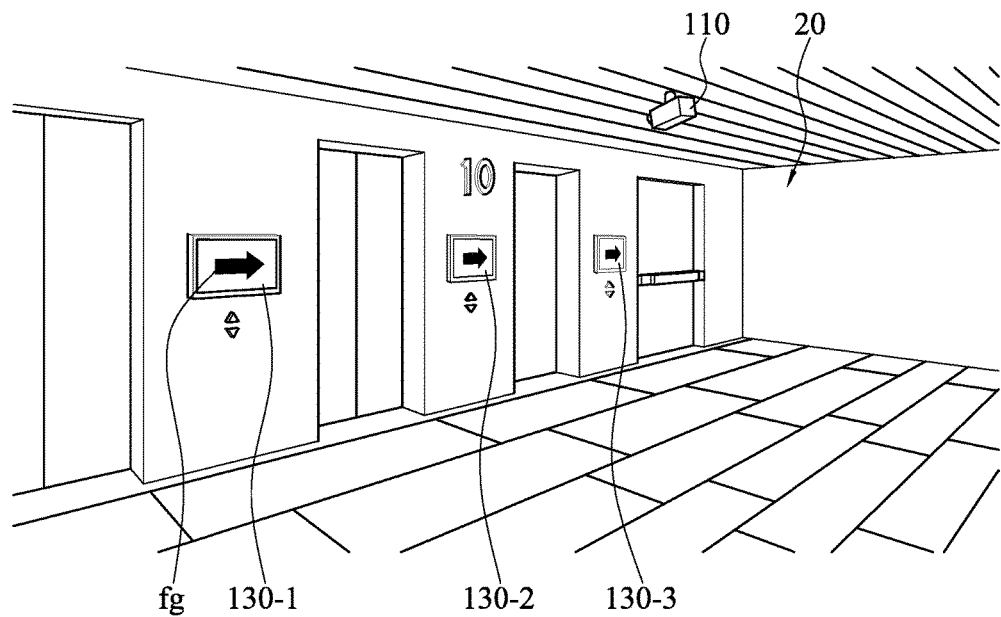
FIG. 11 illustrates a diagram of a specific image displayed in a display device of FIG. 1 according to an embodiment.

For instance, the specific image IMs can be a guide figure indicating escape direction, as shown in FIG. 11.

In some embodiments, the display devices 130-1, 130-2, and 130-3 bound to the same surveillance device 110 can display the same specific image IMs, as shown in FIG. 11. The transmission can be broadcast or multicast to save bandwidth if the number of the display device bound to the surveillance device 110 is more than one.

In other embodiments, the display devices 130-1, 130-2, and 130-3 bound to the same surveillance device 110 can also display different specific images IMs. Herein, each of the specific images IMs is combined with at least one of the second unique identifiers UID21/UID22/UID23, thereby representing which used to display this specific image IMs among the display devices 130-1/130-2/130-3. That is to say, each of the specific images IMs can be transmitted to the corresponding display devices 130-1/130-2/130-3 due to the combined second unique identifiers UID21/UID22/UID23. For example, after a specific field of an extension header in each packet of each of the specific images IMs for being transmitted to each of the display devices 130-1/130-2/130-3 is filled with the second unique identifiers UID21/UID22/UID23 by the electronic device 170, the specific images IMs are transmitted to the cloud server 150 and the cloud server 150 transmits each of the specific images IMs to each of the display devices 130-1/130-2/130-3 according to the second unique identifiers UID21/UID22/UID23 in the specific fields in the packets.

Figure 12:
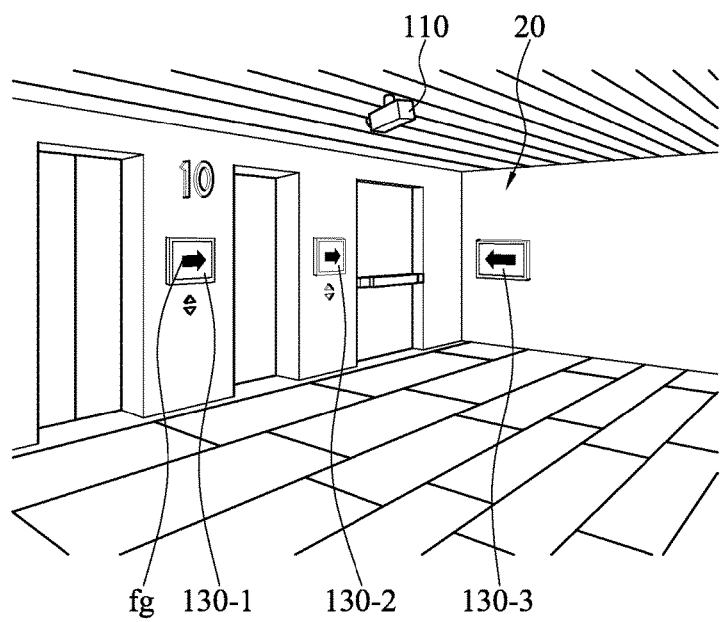
FIG. 12 illustrates a diagram of a specific image displayed in a display device of FIG. 1 according to another embodiment.

In yet other embodiments, a part of the display devices 130-1, 130-2, and 130-3 bound to the same surveillance device 110 can display the same specific image IMs, and another part of the display devices 130-1, 130-2, and 130-3 can display different specific images IMs, as shown in FIG. 12.

For instance, the display devices 130-1 and 130-2 display a specific image IMs which is a right arrow, and the display device 130-3 displays a specific image IMs which is a left arrow.

In some embodiments, the electronic device 170 can transmit the specific image IMs through real time protocol (RTP) packets. An extension header in each RTP packet is filled with the second unique identifiers UID21/UID22/UID23 of the display devices 130-1/130-2/130-3 and is filled with a picture instruction for the display device 130-3 needed to display an image different from a source video, i.e., the specific image IMs generated by the electronic device 170. The picture instruction can be pre defined. For instance, the picture instruction 1 is mirroring, i.e., laterally reversed. For example, as shown in FIG. 12, let's assume that the specific image IMs generated by the electronic device 170 is a right arrow. Filling the picture instruction 1 into the extension headers in packets for the display device 130-3 is to instruct the display device 130-3 to execute a mirroring process in advance after decoding the received specific image IMs and then to output the mirrored specific image IMs. As a result, only one specific image IMs is needed so that load of calculations, transmission time, and the bandwidth of the electronic device 170 can be reduced. Under the circumstance that the transmission is in the manner of broadcast or multicast, the display devices 130-1 and 130-2 decode extension headers of packets received to identify which display devices 130-1, 130-2, 130-3 the packet is for and discard the packets for the display device 130-3. Then, the display device 130-3 displays the mirrored specific image IMs according to the picture instruction in the extension headers. Multiple picture instructions can be defined such that applications of the system can be more elastic.

In other embodiment, the display devices 130-1/130-2/130-3 can include some built-in often-used specific images IMs, e.g., arrows of different directions, and each of the specific images IMs is given with a unique identifier. An extension header in each RTP packet is filled with the second unique identifiers UID21/UID22/UID23 of the display devices 130-1/130-2/130-3, the unique identifiers of the specific images IMs, and the picture instructions. Moreover, the data length of the RTP packet is set to 0 and the payload of the RTP packet is not filled so as to save the bandwidth.

Furthermore, similar specific images IMs, e.g., arrows of different directions, are needed to keep only one copy in the display devices 130-1/130-2/130-3 due to picture instructions so as to save the storage space.

Figure 13:
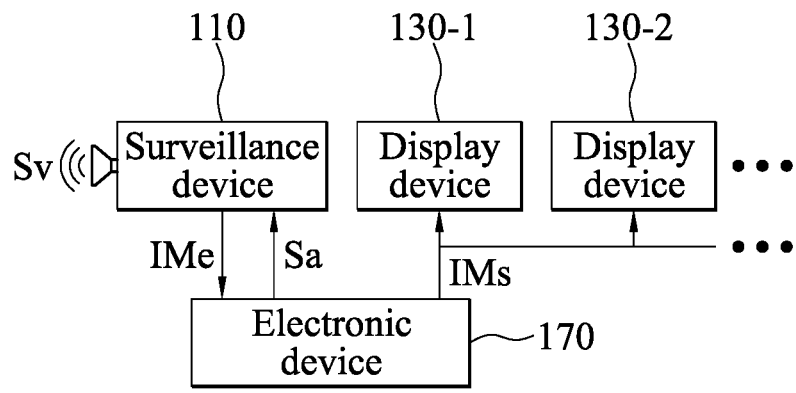
FIG. 13 illustrates a block diagram of partial operation of the network communication system of FIG. 1 according to a third implementation.
Figure 14:
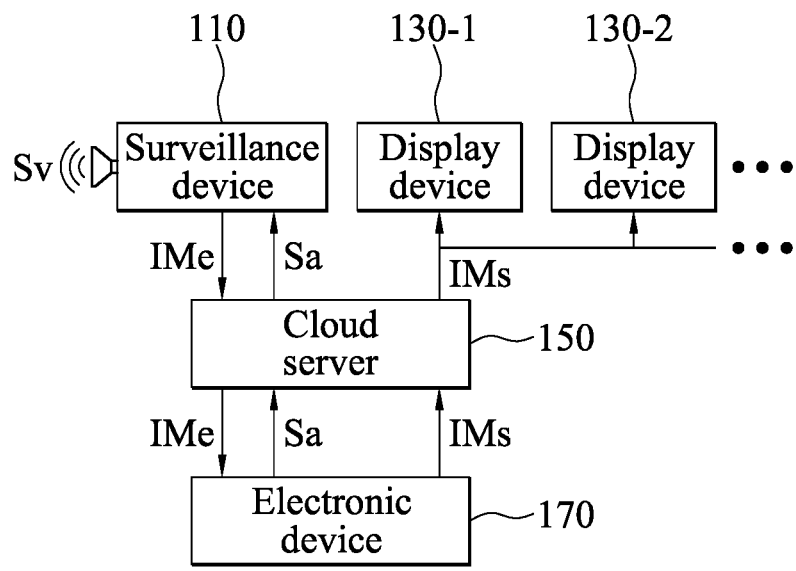
FIG. 14 illustrates a block diagram of partial operation of the network communication system of FIG. 1 according to a fourth implementation.

In some embodiments, the surveillance device 110 comprises a loudspeaker. When the electronic device 170 is simultaneously connected to and communicates with the surveillance device 110 and the display devices 130-1, 130-2, and 130-3, the surveillance device 110 further receives an audio signal Sa from the electronic device 170 and controls the loudspeaker to play a sound Sv according to the received audio signal Sa, as shown in FIGS. 13 and 14.

Figure 15:
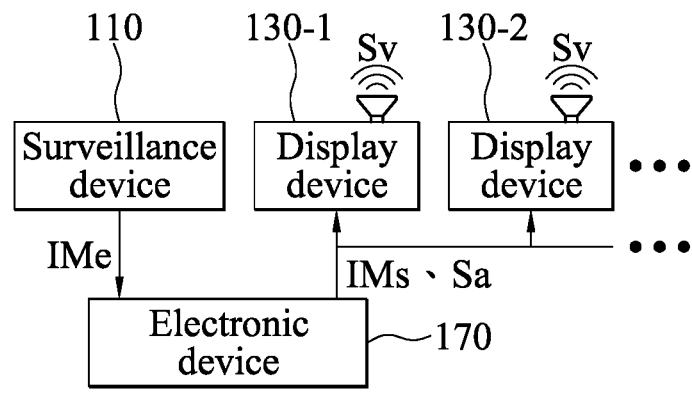
FIG. 15 illustrates a block diagram of partial operation of the network communication system of FIG. 1 according to a fifth implementation.
Figure 16:
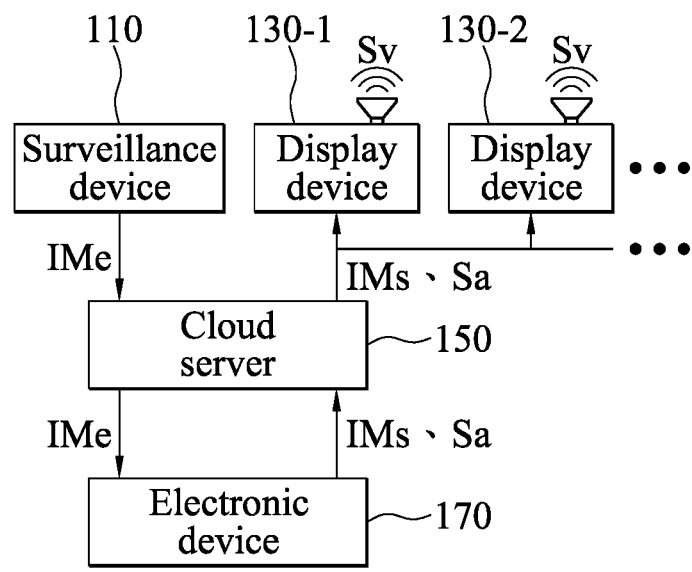
FIG. 16 illustrates a block diagram of partial operation of the network communication system of FIG. 1 according to a sixth implementation.

In some embodiments, each of the display devices 130-1/130-2/130-3 comprises a loudspeaker. When the electronic device 170 is simultaneously connected to and communicates with the surveillance device 110 and the display devices 130-1, 130-2, and 130-3, the display devices 130-1/130-2/130-3 further receive an audio signal Sa from the electronic device 170 and control the loudspeaker to play a sound Sv according to the received audio signal Sa, as shown in FIGS. 15 and 16.

Figure 17:
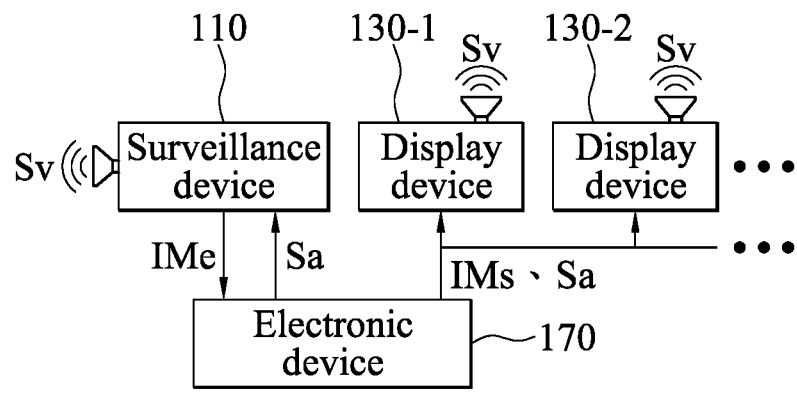
FIG. 17 illustrates a block diagram of partial operation of the network communication system of FIG. 1 according to a seventh implementation.
Figure 18:
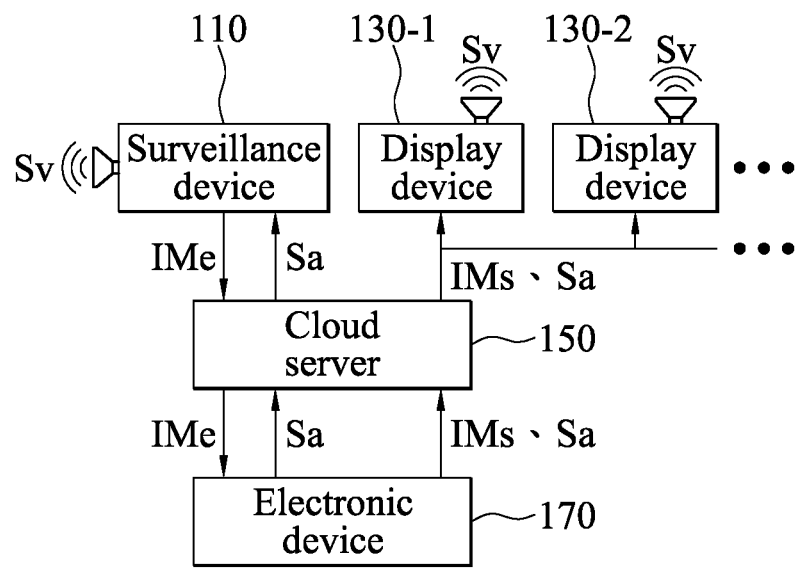
FIG. 18 illustrates a block diagram of partial operation of the network communication system of FIG. 1 according to an eighth implementation.

In some embodiments, the surveillance device 110 and each display device 130, i.e., the display devices 130-1, 130-2, or 130-3, comprise a loudspeaker for playing a sound Sv according to the audio signal Sa from the electronic device 170 when the electronic device 170 is connected to and communicates with the surveillance device 110 and each display device 130, as shown in FIGS. 17 and 18.

Wherein, the binding of the surveillance device 110 and each display device 130 can be accomplished by a binding procedure (steps S60, S70, S80, S90, or S90').

In some embodiments, each display device 130 has operation capability of executing an application program, e.g., a computer application program or a mobile application program. Each display device 130 provides and displays a binding option(s) in the user interface by using the application program, thereby allowing the user to initiate the binding procedure.

Figure 19:
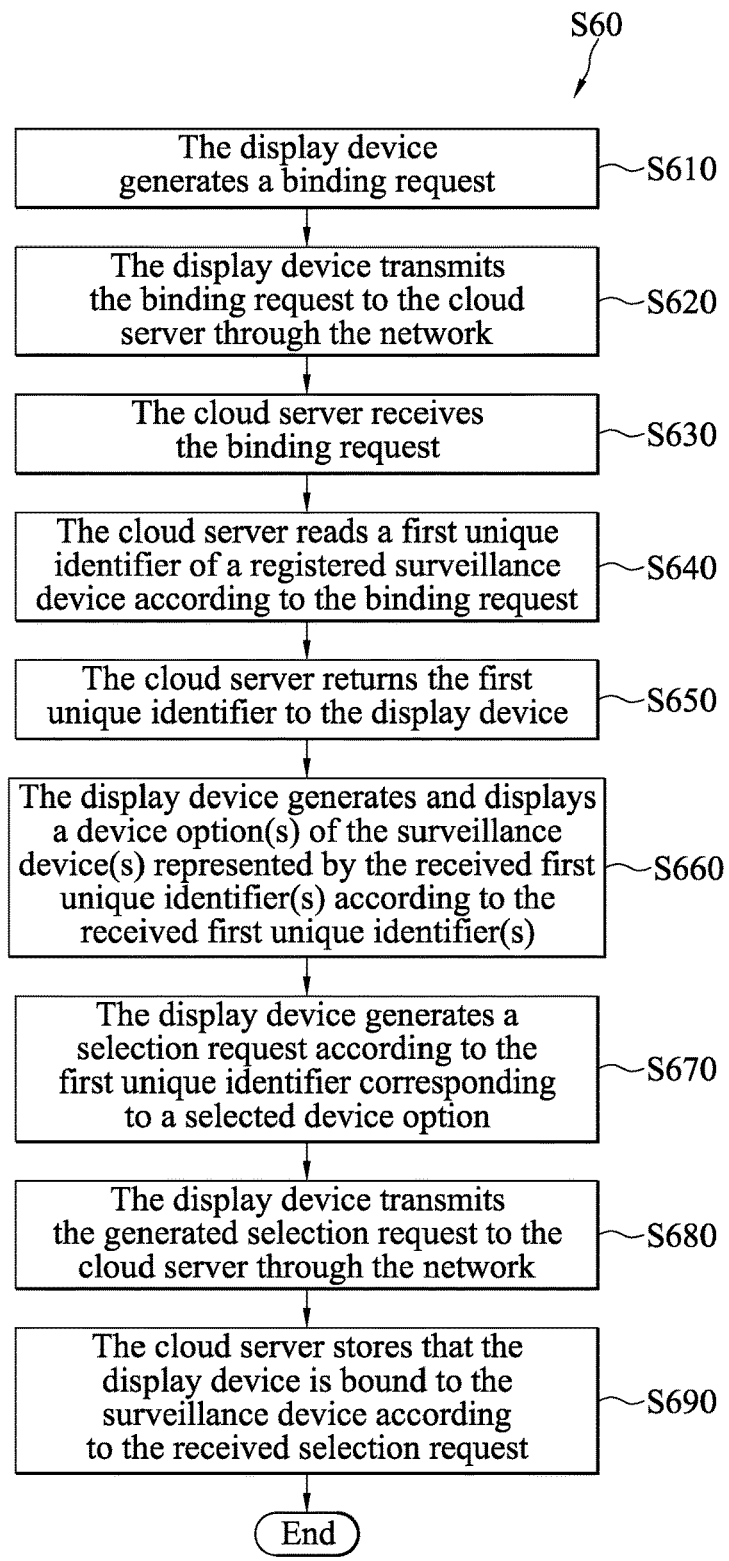
FIG. 19 illustrates a flow chart of a binding procedure according to a first implementation.
Figure 20:
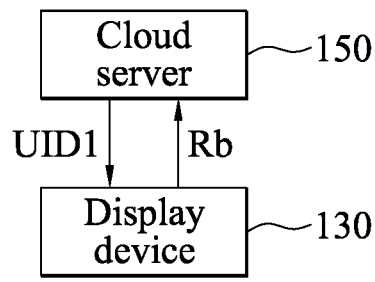
FIGS. 20 to 21 illustrate block diagrams of the binding procedure according to the first implementation.

In some embodiments, as shown in FIG. 19, when the user selects a binding option, the display device 130 generates a binding request Rb corresponding to the binding option (step S610) and transmits the binding request Rb to the cloud server 150 through the network 30 (step S620), as shown in FIG. 20. Herein, the display device 130 can be continuously connected to and communicate with the cloud server 150 after being installed, or can be connected to and communicate with the cloud server 150 only when the binding procedure is executed.

The cloud server 150 receives the binding request Rb from the display device 130 (step S630) and reads the first unique identifier(s) UID1 of the registered surveillance device(s) 110 according to the received binding request Rb (step S640). In an embodiment, the binding request Rb has a set of account ID' and password PW' such that the cloud server 150 reads the first unique identifier(s) UID1 of all of the surveillance device(s) 110 corresponding to a matched set of account ID and password PW in the device table TB according to the set of account ID' and password PW' in the binding request Rb. In another embodiment, the binding request Rb has a geographic position of the display device 130, such that the cloud server 150 generates an electronic map containing the geographic position of the display device 130 according to the binding request Rb. The electronic map has an icon(s) of all of the surveillance device(s) 110 located at a geographic area of the electronic map. The icon of each of the surveillance device(s) 110 is associated with the first unique identifier UID1 of the respective surveillance device 110.

Then the cloud server 150 transmits the read first unique identifier(s) UID1 to the display device 130 (step S650), as shown in FIG. 20. The display device 130 receives the first unique identifier(s) UID1 from the cloud server 150 and, according to the first unique identifier(s) UID1, generates and displays a device option(s) of the surveillance device(s) 110 represented by the received first unique identifiers UID1 (step S660), thereby allowing the user to select a surveillance device 110 needed to be bound. Herein, the device option(s) displayed in the display device 130 can be the first unique identifier(s) UID1, the name of the surveillance device(s) 110, or an icon(s) of the surveillance device(s) 110. Wherein, the icon(s) can be displayed in the form of a matrix, a list, or an electronic map.

Figure 21:
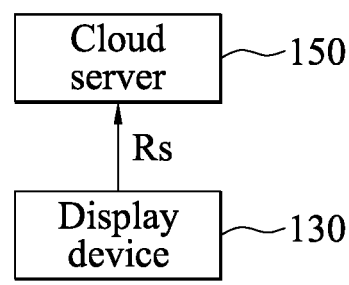

After the user selects the surveillance device 110 needed to be bound by selecting one from the displayed device option(s), the display device 130 generates a selection request Rs according to the first unique identifier UID1 corresponding to the selected device option (step S670) and transmits the generated selection request Rs to the cloud server 150 through the network 30 (step S680), as shown in FIG. 21. In other words, the selection request Rs carries with the selected first unique identifier UID1, i.e., the first unique identifier UID1 of the surveillance device 110 to which the display device 130 requests to be bound.

The cloud server 150 has the display device 130 bound to the surveillance device 110 according to the first unique identifier UID1 in the selection request Rs after receiving the selection request Rs, i.e., storing/adding the second unique identifier UID2 of the display device 130 into the device table TB corresponding to the first unique identifier UID1 (step S690) to form the device table TB of FIG. 2.

Figure 22:
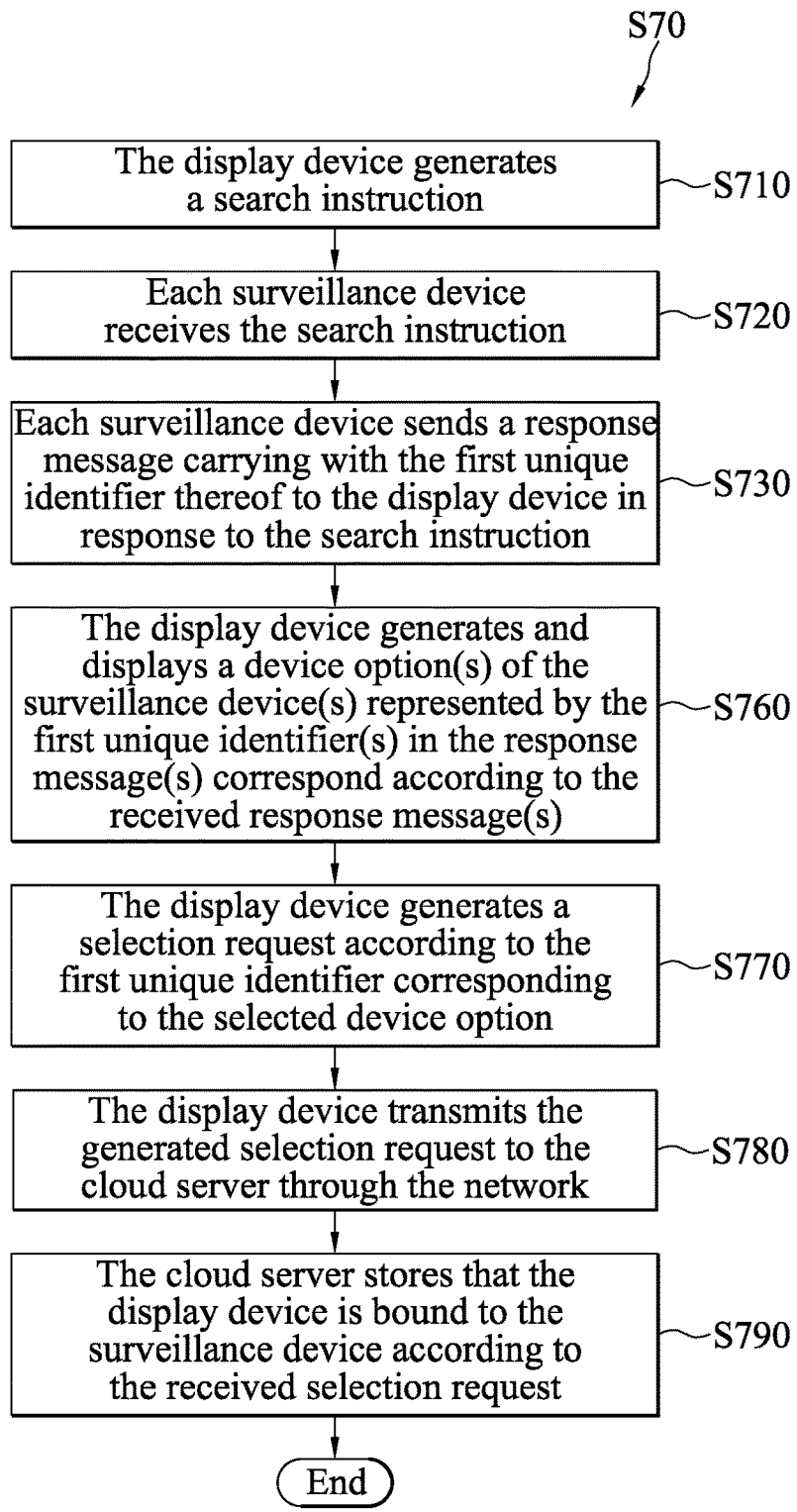
FIG. 22 illustrates a flow chart of a binding procedure according to a second implementation.
Figure 23:
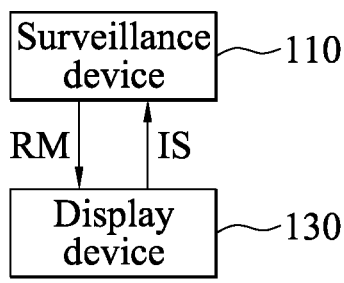
FIGS. 23 to 24 illustrate block diagrams of the binding procedure according to the second implementation.

In some embodiments, referring to FIG. 22, when the user selects a binding option, the display device 130 responses to the selection of the binding option to generate a search instruction IS (step S710), as shown in FIG. 23. Wherein, the search instruction IS can be, for example, a discovery broadcast packet.

The surveillance device 110 around the display device 130 can receive the search instruction IS (step S720). After the surveillance device 110 receives the search instruction, the surveillance device 110 sends a response message RM carrying with the first unique identifier UID1 of the surveillance device 110 to the display device 130 (step S730), as shown in FIG. 23. Wherein, the response message RM can be, for example, a response packet.

Figure 24:
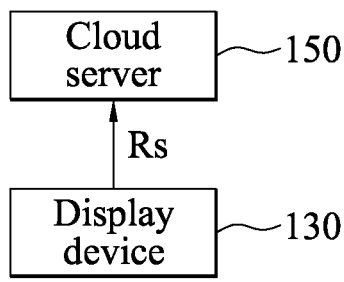

The display device 130 transmits the selection request Rs carrying with the first unique identifier UID1 to the cloud server 150 according to the response message RM, as shown in FIG. 24. Herein, the display device 130 receives the response message RM from the surveillance device 110 and, according to the first unique identifier UID1 in the response message RM, generates and displays a device option(s) of the surveillance device 110 to which the first unique identifier UID1 correspond (step S760), thereby allowing the user to select a surveillance device 110 needed to be bound. After the user selects the surveillance device 110 needed to be bound, the display device 130 generates a selection request Rs according to the first unique identifier UID1 corresponding to the selected device option (step S770) and transmits the generated selection request Rs to the cloud server 150 through the network 30 (step S780), as shown in FIG. 24. In other words, the selection request Rs carries with the selected first unique identifier UID1, i.e., the first unique identifier UID1 of the surveillance device 110 to which the display device 130 requests to be bound.

The cloud server 150 has the display device 130 bound to the surveillance device 110 according to the first unique identifier UID1 in the selection request Rs after receiving the selection request Rs, i.e., storing/adding the second unique identifier UID2 of the display device 130 into the device table TB corresponding to the first unique identifier UID1 (step S790) to form the device table TB of FIG. 2.

Figure 25:
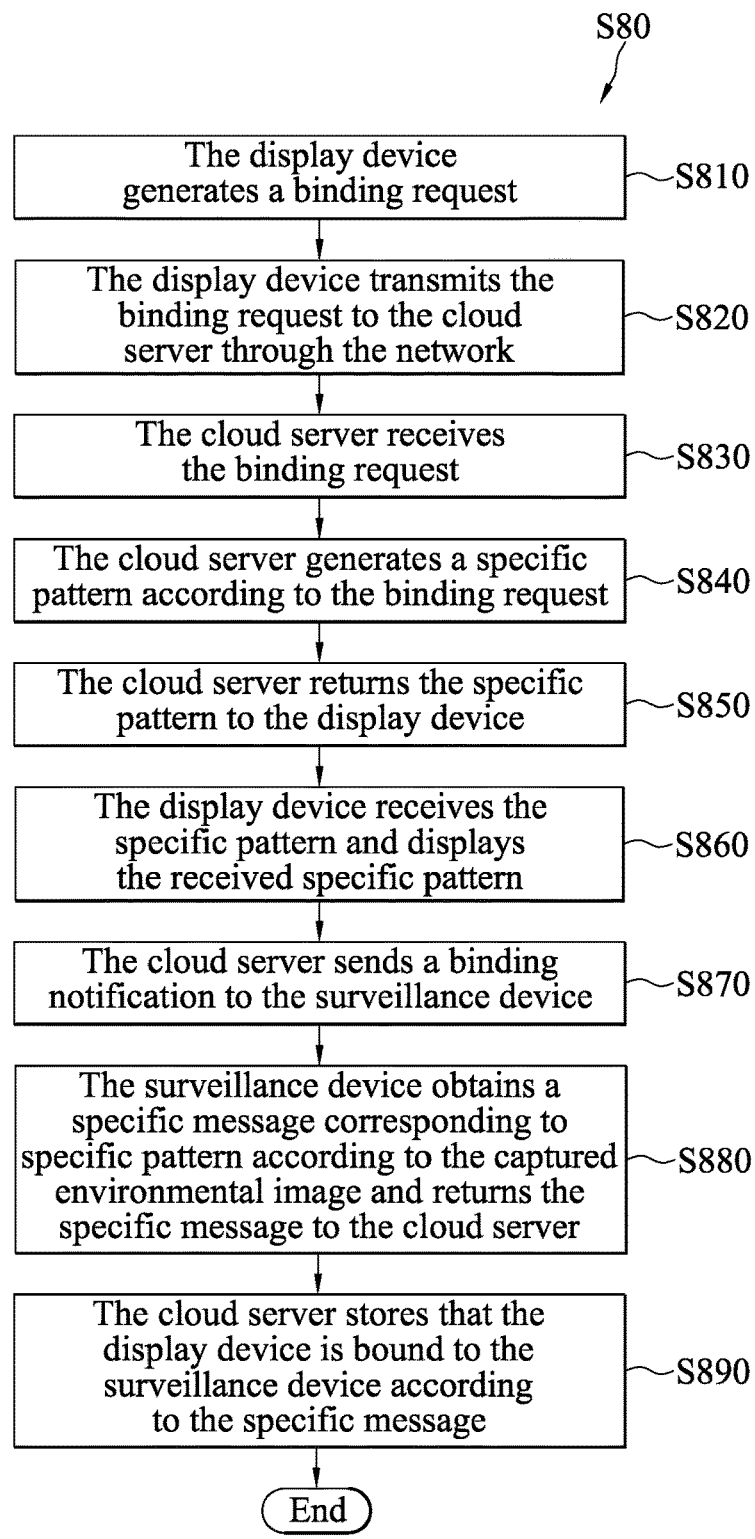
FIG. 25 illustrates a flow chart of a binding procedure according to a third implementation.
Figure 26:
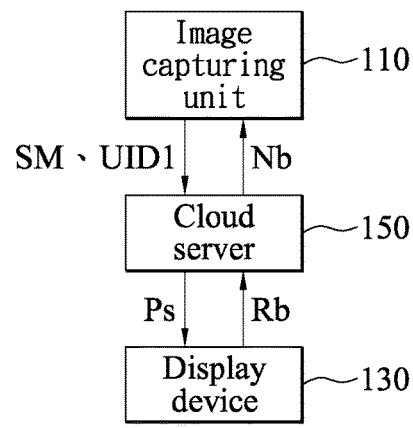
FIG. 26 illustrates a block diagram of the binding procedure according to the third implementation.

In some embodiments, referring to FIG. 25, when the user selects a binding option, the display device 130 generates a binding request Rb corresponding to the binding option (step S810) and transmits the binding request Rb to the cloud server 150 through the network 30 (step S820), as shown in FIG. 26. Herein, the display device 130 can be continuously connected to and communicate with the cloud server 150 after being installed, or can be connected to and communicate with the cloud server 150 only when the binding procedure is executed.

The cloud server 150 receives the binding request Rb from the display device 130 (step S830) and generates a specific pattern Ps according to the binding request Rb (step S840). Wherein, the specific pattern Ps can be, for example, a barcode. The barcode can be a one-dimensional barcode or a two-dimensional barcode. Preferably, the barcode can be a mobile barcode such as a quick response code (QR code). For an instance that the QR code is adopted, the cloud server 150 encodes a specific message SM into the QR code, .i.e., the specific pattern Ps, according to the binding request Rb. Wherein, the specific message SM is a set of sequence number randomly generated. In the step of the generation of the specific pattern Ps, the cloud server 150 generates a set of sequence number according to the binding request Rb and encodes the set of sequence number into the specific pattern Ps.

Then the cloud server 150 returns the generated specific pattern Ps to the display device 130 (step S850), as shown in FIG. 26.

Figure 27:
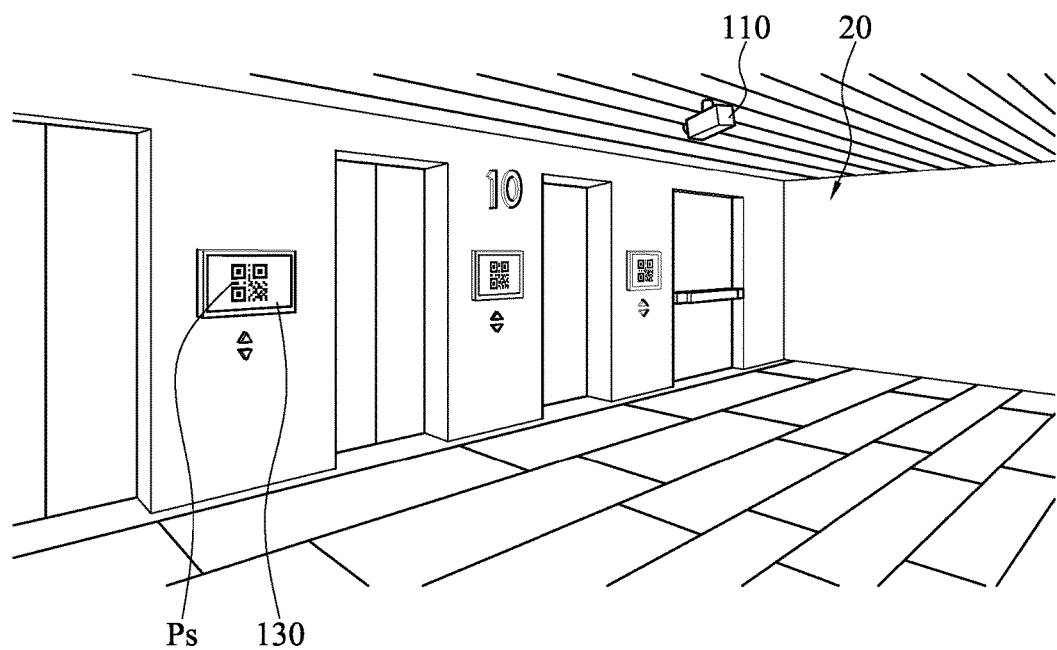
FIG. 27 illustrates a specific pattern according to an implementation.

The display device 130 receives the specific pattern Ps and displays the received specific pattern Ps (step S860), as shown in FIG. 27. Then the cloud server 150 sends a binding notification Nb to all of the registered surveillance devices 110 or all of the surveillance devices 110 around the display device 130 (step S870). Wherein, the surveillance devices 110 around the display device 130 can be the surveillance devices 110 within a predetermined breadth of the geographic position at which the display device 130 is located, or can be the surveillance devices 110 having the same IP address in the first address data and the second address data of the display device 130 but different from the IP port thereof. Wherein, the predetermined breadth can be decided based on the breadth on which the surveillance device 110 is capable of capturing images.

After the surveillance device 110 receives the binding notification Nb, the surveillance device 110 responses to the binding notification Nb to process the capture of the environmental image IMe and the identification of the specific pattern Ps. When the environmental image IMe has the image of the display device 130, the environmental image IMe has the specific pattern Ps. Meanwhile, the surveillance device 110 responses to the binding notification Nb to decode the specific pattern Ps in the environmental image IMe to obtain the specific message SM, and returns the decoded specific message SM and the first unique identifier UID1 to the cloud server 150 (step S880).

The cloud server 150 has the display device 130 bound to the surveillance device 110 having the first unique identifier UID1 according to the specific message SM after receiving the specific message SM and the first unique identifier UID1, i.e., storing/adding the second unique identifier UID2 of the display device 130 into the device table TB corresponding to the first unique identifier UID1 (step S890) to form the device table TB of FIG. 2.

In some embodiments, the binding procedure (step S90) can be executed by a mainframe of a central control center. The mainframe of the central control center has operation capability of executing an application program. The mainframe of the central control center provides and displays a binding option(s) in the user interface thereof by using the application program, thereby allowing the user to initiate the binding procedure.

Figure 28:
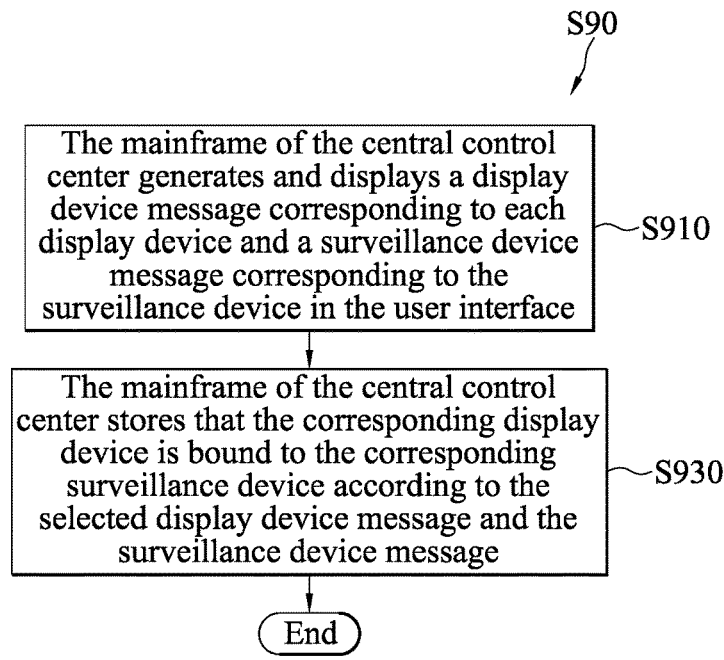
FIG. 28 illustrates a flow chart of a binding procedure according to a fourth implementation.

In some embodiments, the cloud server 150 can be integrated into the mainframe of the central control center. Referring to FIG. 28, when the user selects a binding option, the mainframe of the central control center responses to the selection of the binding option to generate and display a display device message corresponding to each of the display devices 130 in the user interface and a surveillance device message corresponding to the surveillance device 110 in the user interface (step S910), thereby allowing the user to select the display device 130 and the surveillance device 110 bound to each other. Herein, the mainframe of the central control center can display the display device message and the surveillance device message in the electronic map, e.g., an icon of the display device 130 in the electronic map and an icon of the surveillance device 110 in the electronic map.

When the user selects a particular display device message and a particular surveillance device message via the user interface, the mainframe of the central control center has the display device 130 corresponding to the selected display device message bound to the surveillance device 110 corresponding to the selected surveillance device message, i.e., storing/adding the second unique identifier UID2 of the selected display device 130 into the device table TB corresponding to the first unique identifier UID1 of the selected surveillance device 110 (step S930) to form the device table TB of FIG. 2.

In some embodiments, the surveillance device 110 and the display device(s) 130 in the same environment 20 can be connected to and communicate with the cloud server 150 through the mainframe of the central control center.

Figure 29:
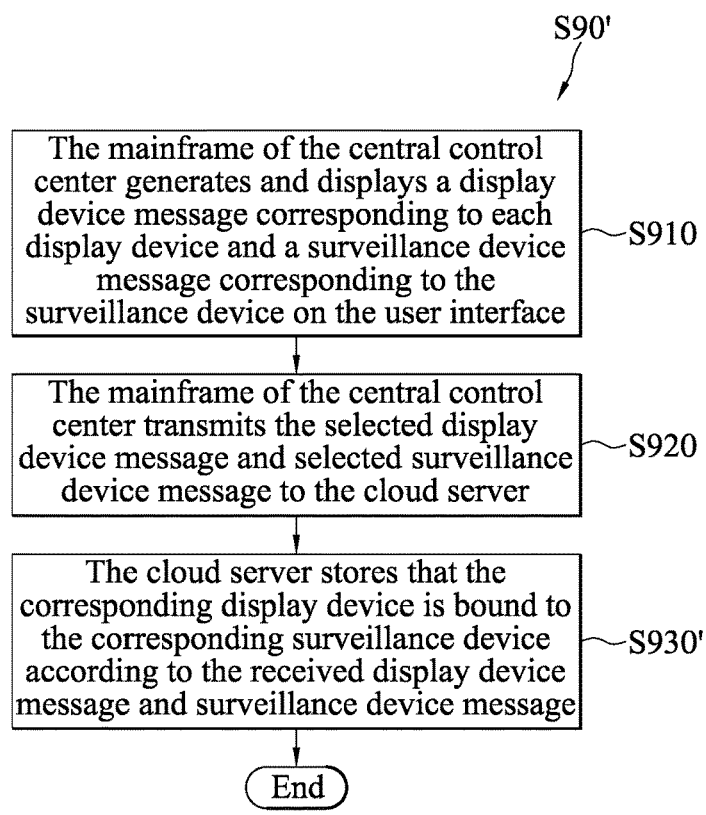
FIG. 29 illustrates a flow chart of a binding procedure according to a fifth implementation.

Referring to FIG. 29, when the user selects a binding option, the mainframe of the central control center responses to the selection of the binding option to generate and display a display device message corresponding to each of the display devices 130 in the user interface and a surveillance device message corresponding to the surveillance device 110 in the user interface (step S910), thereby allowing the user to select the display device 130 and the surveillance device 110 bound to each other.

When the user selects a particular display device message and a particular surveillance device message via the user interface, the mainframe of the central control center transmits the selected display device message and the selected surveillance device message to the cloud server 150 (step S920). The cloud server 150 receives the selected display device message and the selected surveillance device message and has the display device 130 corresponding to the selected display device message bound to the surveillance device 110 corresponding to the selected surveillance device message, i.e., storing/adding the second unique identifier UID2 of the selected display device 130 into the device table TB corresponding to the first unique identifier UID1 of the selected surveillance device 110 (step S930') to form the device table TB of FIG. 2.

Figure 30:
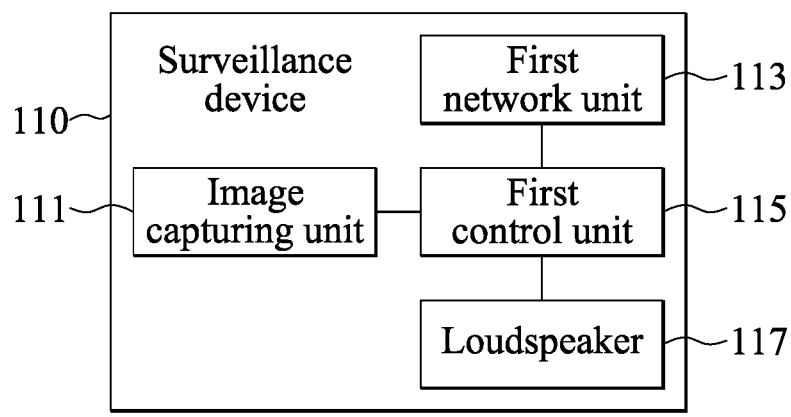
FIG. 30 illustrates a block diagram of a surveillance device according to an implementation.

In an embodiment, referring to FIG. 30, the surveillance device 110 can comprise: an image capturing unit 111, a network unit (hereinafter called "the first network unit 113"), and a control unit (hereinafter called "the first control unit 115"). Herein, the surveillance device 110 can further comprise: a loudspeaker 117.

The first control unit 115 is electrically connected to the image capturing unit 111, the first network unit 113, and the loudspeaker 117. The first control unit 115 is used to control the operation of the image capturing unit 111, the operation of the first network unit 113, and the operation of the loudspeaker 117, controlling the transmission of signals/data/messages/packets, and achieving the execution and the image identification (decoding) of the aforementioned application program. The image capturing unit 111 is used to capture the environmental image IMe. The first network unit 113 can be connected to and communicate with outer devices, e.g., the cloud server 150 or the electronic device 170, through the network 30, and can be used to achieve the aforementioned transmission of signals/data/messages/packets between the first network unit 113 and the outer devices. The loudspeaker 117 is used to play the sound Sv according to the audio signal Sa.

Figure 31:
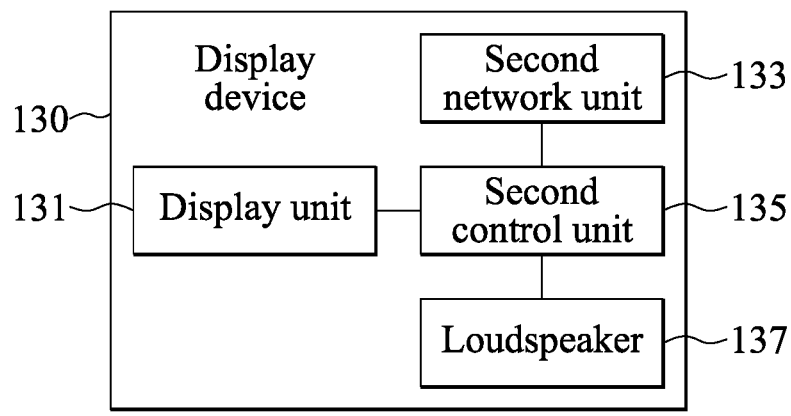
FIG. 31 illustrates a block diagram of a display device according to an implementation.

In an embodiment, referring to FIG. 31, each of the display devices 130 can comprise: a display unit 131, a network unit (hereinafter called "the second network unit 133"), and a control unit (hereinafter called "the second control unit 135"). Herein, each of the display devices 130 can further comprise: a loudspeaker 137.

Herein, the second control unit 135 is electrically connected to the display unit 131, the second network unit 133, and the loudspeaker 137. The second control unit 135 is used to control the operation of the display unit 131, the operation of the second network unit 133, and the operation of the loudspeaker 137, and controlling the transmission of signals/data/messages/packets during operation. The display units 131 are generally used to respectively display usual pictures, such as TV programs, game pictures, advertisements, activity summaries, or floor guides. The display unit 131 is used to display the specific image IMs when being connected to and communicating with the electronic device 170. The second network unit 133 can be connected to and communicate with outer devices, e.g., the cloud server 150 or the electronic device 170, through the network 30, and can be used to achieve the aforementioned transmission of signals/data/messages/packets between the second network unit 133 and the outer devices. The loudspeaker 137 is used to play the sound Sv according to the audio signal Sa.

Wherein, the aforementioned user interface can be a touch screen, an assembly of a usual display screen and multiple physical buttons, or an assembly of a touch screen and one or more physical buttons. The aforementioned control unit can be achieved by one or more processing components. Each of the processing components can be a micro processor, a micro controller, a digital signal processor, a micro calculator, a central processing unit, a field programmable gate array, a programmable logic device, a state machine, a logical circuit, an analog circuit, a digital circuit, and/or any device based on (analog and/or digital) operating instructions/operating signals. The aforementioned display unit 131 can be a display panel.

Moreover, each device in the network communication system (the surveillance device 110, the display device 130-1, 130-2, or 130-3, the cloud server 150, or the electronic device 170) comprises a storage unit to store relative software/firmware and needed or generated signals, data, messages, packets, files, or combinations thereof during operation. Each storage unit can be achieved by one or more storage components. Herein, for example, the storage component can be, but not limited to, a volatile memory or a nonvolatile memory. Each of the aforementioned network units can be a wired network module, a wireless network module, a wireless communication module, or combinations thereof.

Concisely, available surveillance devices and display devices in the same environment (e.g., surveillance cameras for monitoring environmental safety installed on the ceiling outside an elevator of a building, such as a department store building, a commercial office building, a government building, or a shopping mall building and liquid crystal displays for displaying advertisements or floor guides installed on a wall outside an elevator; or home use web cameras for monitoring environmental safety and televisions or tablets for entertaining) are integrated based on the network communication system and method thereof of the instant disclosure, such that real-time dynamic instructions for applications of evacuation and telehealth can be easily and timely provided. Moreover, regarding implementation of embodiments of the instant disclosure, cost is relatively low, binding setting is relatively easy, hardware design is relatively simple, deployment of components is elastic, and bandwidth occupancy is relatively less based on the network communication system and method thereof of the instant disclosure.

While the instant disclosure has been described by way of example and in terms of the preferred embodiments, it is to be understood that the invention needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A network communication system, comprising:
   a surveillance device for capturing an environmental image of an environment;
   at least one display device;
   a cloud server connected to and communicating with the surveillance device and the at least one display device through a network, wherein the cloud server stores connection information of the surveillance device and at least one connection information of the at least one display device bound to the surveillance device; and
   an electronic device connected to the cloud server through the network, wherein when the electronic device sends a connection request requesting to be connected to and communicate with the surveillance device to the cloud server, the cloud server enables the electronic device to be simultaneously connected to and communicate with the surveillance device and the at least one display device bound to the surveillance device through the network according to the connection request and the connection information such that the electronic device receives the environmental image from the surveillance device and transmits at least one specific image to at least one of the at least one display device to display through the network, with additional display devices each displaying different specific images due to unique identifiers of the different specific images, and
   wherein the binding of the surveillance device and each of the display devices is accomplished by a binding procedure; and wherein during each of the binding procedures, the cloud server receives a binding request from the display device, generates and returns a specific pattern to the display device according to the binding request, and stores that the display device is bound to the surveillance device when receiving a specific message corresponding to the specific pattern from the surveillance device.

2. The network communication system of claim 1, wherein the electronic device receives the environmental image from the surveillance device through the cloud server, and the electronic device transmits the at least one specific image to the at least one of the at least one display device through the cloud server.

3. The network communication system of claim 1, wherein the surveillance device comprises: a loudspeaker, wherein when the electronic device is simultaneously connected to and communicates with the surveillance device and the at least one display device hound to the surveillance device, the loudspeaker receives an audio signal from the electronic device and plays a sound according to the received audio signal.

4. The network communication system of claim 1, wherein each of the display devices comprises: a loudspeaker, wherein when the electronic device is simultaneously connected to and communicates with the surveillance device and the at least one display device bound to the surveillance device, the loudspeaker receives an audio signal from the electronic device and plays a sound according to the received audio signal.

5. The network communication system of claim 1, wherein when the electronic device sends a. connection request requesting to he connected to and communicate with the surveillance device to the cloud server, the cloud server further transmits at least one unique identifier of the at least one display device to the electronic device according to the connection request; and wherein each of the at least one specific image is corresponding to one of the at least one unique identifier, and the electronic device transmits each of the at least one specific image to the corresponding display device according to the corresponding unique identifier.

6. The network communication system of claim 1, wherein during each of the binding procedures, the cloud server returns a unique identifier of the surveillance device to the display device according to the binding request, receives a selection request corresponding to the unique identifier from the display device, and stores that the display device is bound to the surveillance device according to the selection request.

7. The network communication system of claim 1, wherein the specific message corresponding to the specific pattern is a set of sequence number randomly generated.

8. The network communication system of claim 1, wherein during each of the binding procedures, the display device sends a search instruction, the surveillance device sends a response message with a unique identifier of the surveillance device to the display device when receiving the search instruction, the display device transmits a selection request with the unique identifier to the cloud server according to the response message, and the cloud server stores that the display device is bound to the surveillance device corresponding to the unique identifier according to the selection response.

9. The network communication system of claim 1, wherein the cloud server is integrated into a mainframe of a central control center, the mainframe of the central control center provides a user interface, and each of the binding procedures is accomplished by selecting a display device message corresponding to each of the display devices displayed in the user interface and a surveillance device message corresponding to the surveillance device displayed in the user interface.

10. A network communication method, comprising:
    receiving a connection request from an electronic device through a network by a cloud server, wherein the connection request comprises a first unique identifier of a surveillance device requesting communication;
    reading connection information of the surveillance device and at least one connection information of at least one display device bound to the surveillance device according to the first unique identifier by the cloud server;
    enabling the electronic device to be simultaneously connected to and communicate with the surveillance device and the at least one display device through the network by the read connection information;
    transmitting an environmental image from the surveillance device to the electronic device and transmitting at least one specific image from the electronic device to the at least one display device through the network when the electronic device is simultaneously connected to and communicates with the surveillance device and the at least one display device, the at least one specific image being combined with at least one of a second unique identifier to correspond to the at least one display device;
    receiving a binding request from a first display device of the at least one display device by the cloud server;
    generating a specific pattern according to the binding request by the cloud server;
    returning the specific pattern to the first display device to enable the first display device to display the specific pattern by the cloud server;
    shooting the specific pattern to obtain a specific message corresponding to the specific pattern by the surveillance device;

receiving the specific message from the surveillance device by the cloud server; and storing that the first display device is bound to the surveillance device by the cloud server.

11. The network communication method of claim 10, wherein the specific message corresponding to the specific pattern is a set of sequence number randomly generated; and wherein the step of the generation of the specific pattern comprises: generating a set of sequence number according to the binding request by the cloud server and encoding the set of sequence number into the specific pattern by the cloud server.

* * * * *